(12) United States Patent
Fitzpatrick et al.

(10) Patent No.: US 11,269,905 B2
(45) Date of Patent: Mar. 8, 2022

(54) INTERACTION BETWEEN VISUALIZATIONS AND OTHER DATA CONTROLS IN AN INFORMATION SYSTEM BY MATCHING ATTRIBUTES IN DIFFERENT DATASETS

(71) Applicant: INTERNATIONAL BUSINESS MACHINES CORPORATION, Armonk, NY (US)

(72) Inventors: Gregory Fitzpatrick, Bedfont Lakes (GB); Enam Khan, Mitcham (GB); Alban Pui Man Tsui, Whetstone (GB); John Kellett, Weybridge (GB); Ramon Leonard Hendrik Pisters, Weert (NL); Colin Anthony McLay, Richmond (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 379 days.

(21) Appl. No.: 16/446,943

(22) Filed: Jun. 20, 2019

(65) Prior Publication Data

US 2020/0401580 A1 Dec. 24, 2020

(51) Int. Cl.
*G06F 16/248* (2019.01)
*G06F 16/2457* (2019.01)
*G06F 16/28* (2019.01)

(52) U.S. Cl.
CPC ...... *G06F 16/248* (2019.01); *G06F 16/24578* (2019.01); *G06F 16/288* (2019.01)

(58) Field of Classification Search
CPC .... G06F 16/248; G06F 16/288; G06F 16/285; G06F 16/9024; G06F 3/0482

(Continued)

(56) References Cited

U.S. PATENT DOCUMENTS 8,660,912 B1 * 2/2014 Dandekar .............. G06Q 30/02
705/27.1
8,972,421 B2 3/2015 Vishnubhatta et al.
(Continued)

FOREIGN PATENT DOCUMENTS

CN 107943863 A 4/2018
EP 3005174 A4 4/2016

OTHER PUBLICATIONS

Anonymous, "Filter Data Across Multiple Data Sources", https://onlinehelp.tableau.com/current/pro/desktop/en-us/filter_across_datasources.htm. Tableau, accessed Jun. 18, 2019, 9 pages.

(Continued)

*Primary Examiner* — Robert W Beausoliel, Jr.
*Assistant Examiner* — Pedro J Santos
(74) *Attorney, Agent, or Firm* — Robert Shatto; Andrew D. Wright; Roberts Calderon Safran & Cole, P.C.

(57) ABSTRACT

A computer-implemented method includes analyzing a first dataset to extract metadata that corresponds to a first visualization; analyzing a second dataset to extract metadata; comparing the metadata of the datasets; deriving based on the comparing, a level of correlation between attributes of the datasets; establishing a score for each of the levels of correlation; determining that a first attribute of the first dataset and a first attribute of the second dataset are a match in response to the establishing of a score for the level of correlation of the first attributes of the datasets; determining that the datasets are related in response to the determining that the first attributes of the datasets are a match; and directing the displaying of a second visualization, the second visualization being a visual representation that includes data from the second dataset.

20 Claims, 15 Drawing Sheets

(58) Field of Classification Search
USPC .................................. 707/E17.108, 737, 722
See application file for complete search history.

(56) References Cited

U.S. PATENT DOCUMENTS

| | | |
|---|---|---|
| 9,031,895 B2 | 5/2015 | Schon |
| 9,075,859 B2 | 7/2015 | Vierich et al. |
| 9,123,006 B2 | 9/2015 | Carter et al. |
| 9,396,474 B2 | 7/2016 | Gu et al. |
| 9,495,207 B1 | 11/2016 | Pijesivac-Grbovic et al. |
| 9,558,245 B1 | 1/2017 | Gao et al. |
| 2009/0182728 A1* | 7/2009 | Anderson ......... G06F 16/90344 |
| 2011/0295860 A1 | 12/2011 | Dewar et al. |
| 2015/0006515 A1 | 1/2015 | Hopkins |
| 2016/0092557 A1* | 3/2016 | Stojanovic ............ G06F 16/254 |
| | | 707/723 |

OTHER PUBLICATIONS

Mell et al., "The NIST Definition of Cloud Computing", NIST, Special Publication 800-145, Sep. 2011, 7 pages.

* cited by examiner

| Attribute 1 | Data type: string<br>Distinct values: 15<br>Attribute name: CTRY<br>Sample values: {Spain, France, Greece, Germany, Finland} |
|---|---|

| Attribute 1 | Data type: string<br>Distinct values: 2<br>Attribute name: Product<br>Sample values: Apples, Oranges |
|---|---|
| Attribute 2 | Data type: string<br>Distinct values: 4<br>Attribute name: Country<br>Sample values: {Spain, France, Greece, Germany} |
| Attribute 3 | Data type: decimal<br>Distinct values: 8<br>Attribute name: Profit<br>Sample values: 0.12, ...<br>Min: 0.12<br>Max: 0.25<br>Stdev: 0.069076 |

| Brand | Model | CS Score |
|---|---|---|
| Brand A | A320 | 93.42 |
| Brand A | A550 | 93.33 |
| Brand B | B100 | 93.14 |
| Brand C | C200 | 93.11 |
| Brand D | D250 | 93.03 |
| Brand E | E50 | 93.01 |
| Brand F | F75 | 92.80 |
| Brand B | B150 | 92.42 |

| Attribute 1 | Data type: string<br>Distinct values: 6<br>Attribute name: Brand<br>Sample values: Brand A, Brand B, Brand C, Brand D, Brand E, Brand F |
|---|---|
| Attribute 2 | Data type: string<br>Distinct values: 8<br>Attribute name: Model<br>Sample values: A320, A550, B100, C200, D250, E50, F75, B150 |
| Attribute 3 | Data type: decimal<br>Distinct values: 8<br>Attribute name: CS Score<br>Sample values: 93.42, ...<br>Min: 92.8<br>Max: 93.42<br>Stdev: 0.313038108 |

FIG. 19

| Type | Volume |
|---|---|
| Brand C | 10213486 |
| Brand G | 10126281 |
| Brand H | 7889538 |
| Brand I | 7793066 |
| Brand J | 6429485 |
| Brand K | 5556241 |
| Brand L | 4999266 |
| Brand M | 4681457 |
| Brand N | 3373278 |
| Brand E | 2945295 |
| Brand A | 1234567 |
| Brand B | 1011876 |

| Attribute 1 | Data type: string<br>Distinct values: 12<br>Attribute name: Type<br>Sample values: Brand A, Brand B, Brand C, Brand E, Brand G... |
|---|---|
| Attribute 2 | Data type: integer<br>Distinct values: 12<br>Attribute name: Volume<br>Sample values:10213486, ...<br>Min: 1011876<br>Max: 10213486<br>Stdev: 3100683.102 |

FIG. 21

INTERACTION BETWEEN VISUALIZATIONS AND OTHER DATA CONTROLS IN AN INFORMATION SYSTEM BY MATCHING ATTRIBUTES IN DIFFERENT DATASETS

BACKGROUND

The present invention relates generally to interaction between multiple datasets and, more particularly, to determining if two datasets contain related data by identifying an attribute in both datasets that is considered to be a match.

In the modern day of access to large amounts of data from multiple sources, users want to leverage this data in reporting and other solutions.

SUMMARY

In a first aspect of the invention, there is a computer-implemented method including: analyzing, by a computer device, a first dataset to extract metadata of the first dataset, the first dataset corresponding to a first visualization; analyzing, by the computer device, a second dataset to extract metadata of the second dataset; comparing, by the computer device, the metadata of the first dataset to the metadata of the second dataset; deriving, by the computer device, and based on the comparing, levels of correlation between attributes of the first dataset and attributes of the second dataset; establishing, by the computer device, a score for each of the levels of correlation; determining, by the computer device, that a first attribute of the first dataset and a first attribute of the second dataset are a match in response to the establishing of a score for the level of correlation of the first attribute of the first dataset and a first attribute of the second dataset; determining, by the computer device, that the first dataset and the second dataset are related in response to the determining that the first attribute of the first dataset and the first attribute of the second dataset are a match; and directing, by the computer device, the displaying of a second visualization, the second visualization being a visual representation that includes data from the second dataset.

In another aspect of the invention, there is a computer program product including a computer readable storage medium having program instructions embodied therewith. The program instructions are executable by a computing device to cause the computing device to: analyze a first dataset to extract metadata of the first dataset, the first dataset corresponding to a first visualization; analyze a second dataset to extract metadata of the second dataset; compare the metadata of the first dataset to the metadata of the second dataset; derive, based on the comparing, levels of correlation between attributes of the first dataset and attributes of the second dataset; establish a score for each of the levels of correlation; determine that a first attribute of the first dataset and a first attribute of the second dataset are a match in response to the establishing of a score for the level of correlation of the first attribute of the first dataset and a first attribute of the second dataset; and determine that the first dataset and the second dataset are related in response to the determining that the first attribute of the first dataset and the first attribute of the second dataset are a match.

In another aspect of the invention, there is system including a processor, a computer readable memory, and a computer readable storage medium. The system includes program instructions to: analyze a first dataset to extract metadata of the first dataset; analyze a second dataset to extract metadata of the second dataset; compare the metadata of the first dataset to the metadata of the second dataset; derive, based on the comparing, levels of correlation between attributes of the first dataset and attributes of the second dataset; establish a score for each of the levels of correlation; determine that a first attribute of the first dataset and a first attribute of the second dataset are a match in response to the establishing of a score for the level of correlation of the first attribute of the first dataset and a first attribute of the second dataset; and determine that the first dataset and the second dataset are related in response to the determining that the first attribute of the first dataset and the first attribute of the second dataset are a match, wherein the program instructions are stored on the computer readable storage medium for execution by the processor via the computer readable memory. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

FIG. 18 shows a table in accordance with aspects of the invention.

FIG. 19 shows the results of an analysis of attributes in accordance with aspects of the invention.

FIG. 20 shows a table in accordance with aspects of the invention.

FIG. 21 shows the results of an analysis of attributes in accordance with aspects of the invention.

DETAILED DESCRIPTION

Figure 1:
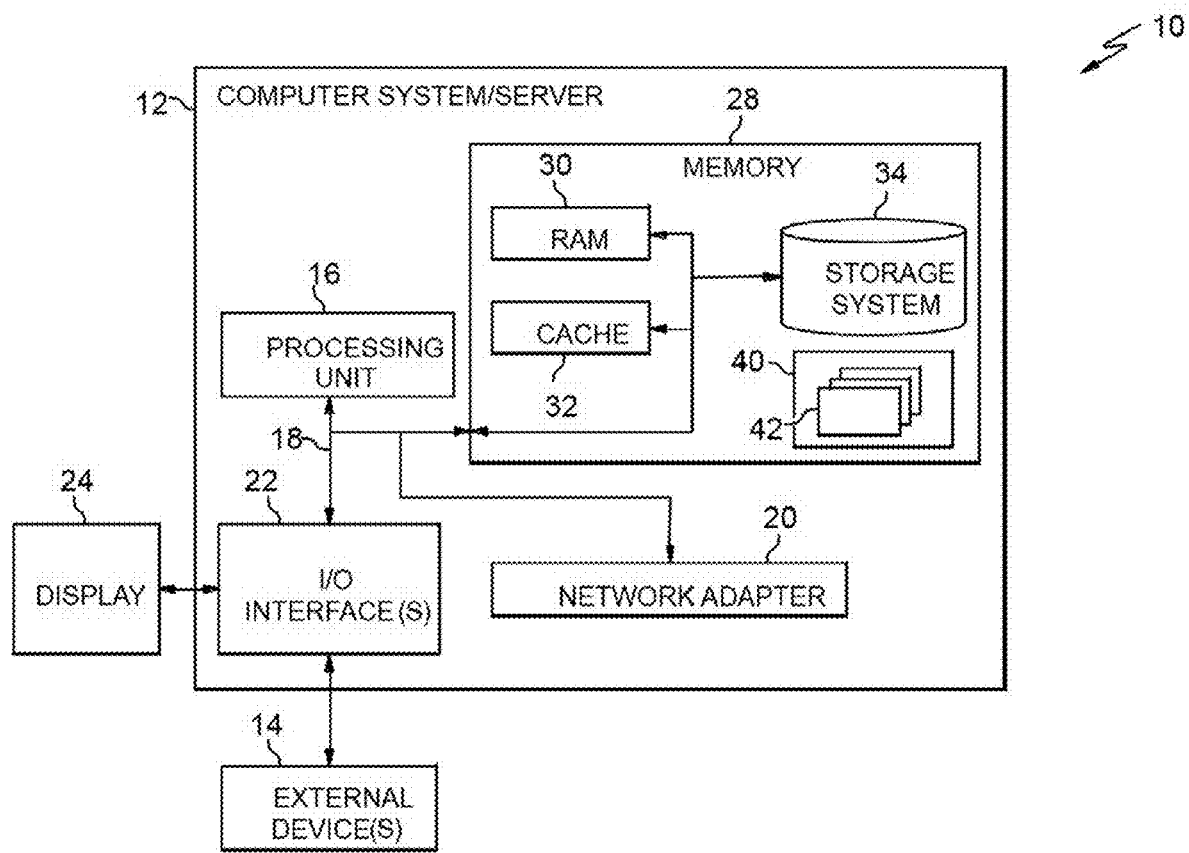
FIG. 1 depicts a cloud computing node according to an embodiment of the present invention.

The present invention relates generally to interaction between visualizations and other data controls in an information system by matching attributes in different datasets and, more particularly, to determining if two datasets are related by identifying an attribute in both datasets that is considered to be a match. According to aspects of the invention, a relationship establishment module analyses two datasets and compares metadata of attributes of the two datasets to determine if the two datasets are related. In embodiments, the relationship establishment module establishes a score for each of a number of levels of correlation between attributes of the two datasets, determines that an attribute of the first dataset and an attribute of the second dataset are a match in response to the related score being higher than a predetermined threshold, and determines that the first dataset and the second dataset are related in response to the attribute of the first dataset and the attribute of the second dataset being a match. In this manner, implementations of the invention automatically determine, without independent modeling by a skilled data scientist, that a first dataset which a user is accessing is related to a second dataset that the user is not accessing, and presents information from the second dataset to the user.

In the modern day of access to large amounts of data from multiple sources, users want to leverage this data in their reporting and business information solutions, for example. However, having to "model" and connect all these data sources before being able to use them together can be prohibitive. The modern user expects to be able to simply use any dataset that they have access to. As a result, modern information solutions try to automate or eliminate this cumbersome step. Embodiments of the invention provide a solution to this problem.

Information systems can present to the user multiple visualizations which may be collectively of interest to a user. It is useful in such a system for visualizations to react to selections in other visualizations or selections in filter controls (collectively referred to as filter events). This adds interactivity to the system making it much more useful and can be used in dashboard products and other applications in the area of, for example, business information.

Data used to populate visualizations may be from data sources that are not known to be related. In some systems, if all visualizations are to react to filter events, they are either using the same dataset or the correlation between attributes in different datasets must be established. In some systems, establishing these correlations requires the introduction of a data modelling step in order to permit the system to recognize that the data in the two datasets are related.

Embodiments of the invention allow a user to construct an interactive information application containing visualizations based upon multiple unrelated datasets without the need for data modelling. This results in a simpler and streamlined experience for the user.

In embodiments, datasets added to the application are analyzed to extract a range of characteristics (metadata) about each of its attributes. A heuristic comparison using this metadata is made to determine which attributes in one dataset are considered likely matches to attributes in other datasets.

When using an information application in accordance with embodiments of the invention, the user highlights a data point in a visualization (for example a bar in a bar chart) and the system filters one or more target visualizations where there is a matching attribute. A filter control is also available to the user. Selecting values in the filter control filters any target visualizations whose dataset contains a matching attribute.

Implementations of the invention improve the performance of a computer-based data presentation system by determining relationships between datasets that are on different systems and/or in different formats by analyzing metadata of attributes of the datasets, establishing scores for correlations between the attributes, and then determining whether the two datasets are related based on the scores. In this manner, implementations of the invention provide additional related data (and visualizations thereof on an electronic display device) from different datasets to a user without the user having to first carry out a data modeling step. Implementations of the invention are improvements to the functioning of a computer in that they determine that two or more datasets are related without requiring the creation of a data model. Implementations of the invention add unconventional steps to displaying data by producing scores for attributes of two different datasets and determining that the two datasets are related based on the scores.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
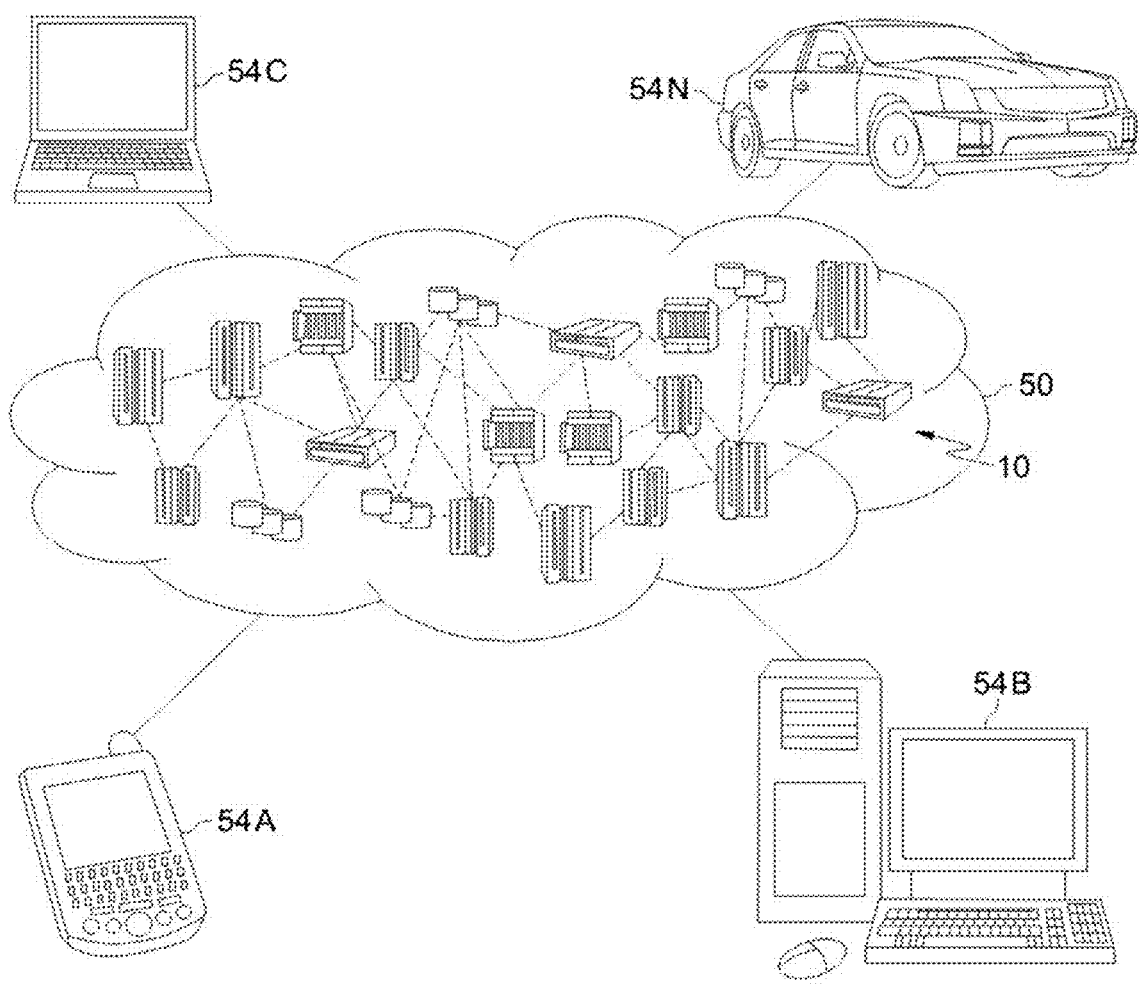
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
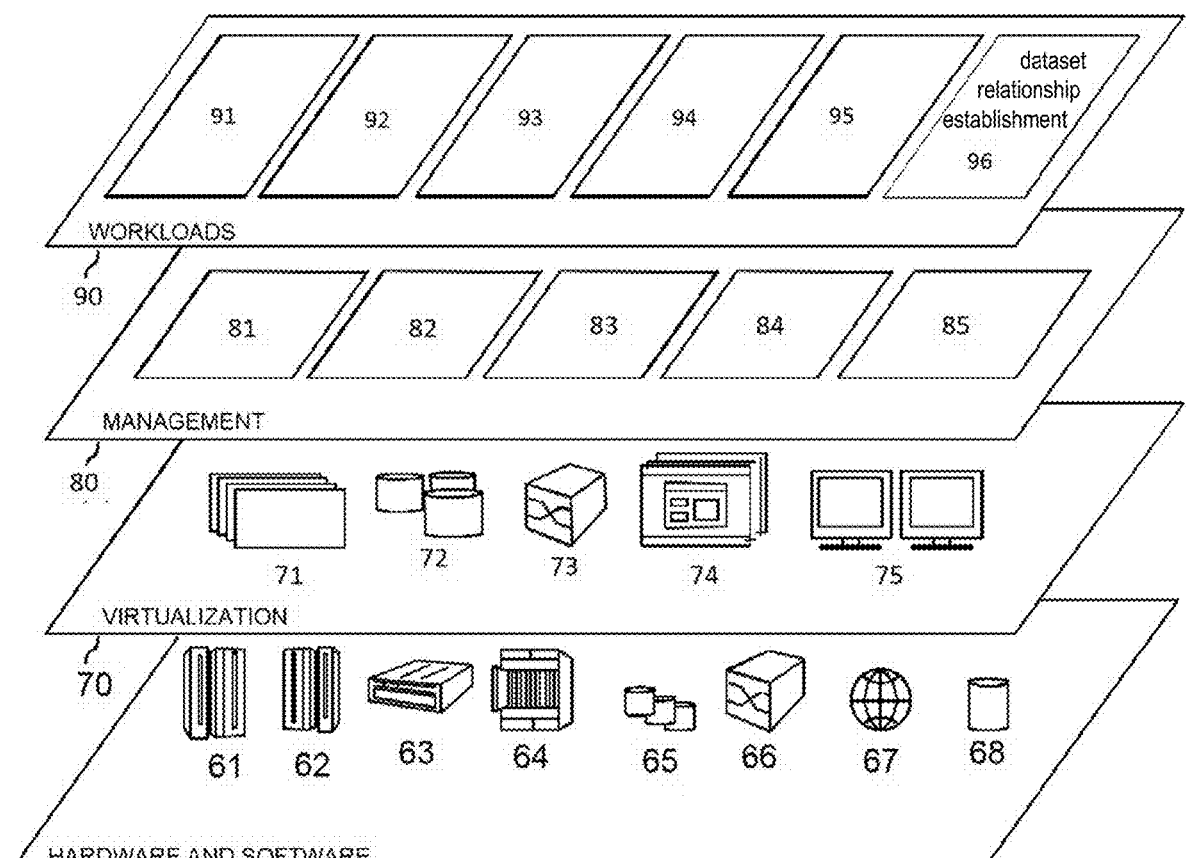
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dataset relationship establishment 96.

Implementations of the invention may include a computer system/server 12 of FIG. 1 in which one or more of the program modules 42 are configured to perform (or cause the computer system/server 12 to perform) one of more functions of the dataset relationship establishment 96 of FIG. 3. For example, the one or more of the program modules 42 may be configured to: analyze a first dataset to extract metadata of the first dataset, the first dataset corresponding to a first visualization; analyze a second dataset to extract metadata of the second dataset; compare the metadata of attributes of the first dataset to the metadata of attributes of the second dataset; derive, based on the comparing, levels of correlation between the attributes of the first dataset and the attributes of the second dataset; establish a score for each of the levels of correlation; determine that a first attribute of the first dataset and a first attribute of the second dataset are a match in response to the establishing of a score for the level of correlation of the first attribute of the first dataset and a first attribute of the second dataset; determine that the first dataset and the second dataset are related in response to the determining that the first attribute of the first dataset and the first attribute of the second dataset are a match; and direct the displaying of a second visualization, the second visualization being a visual representation that includes data from the second dataset.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
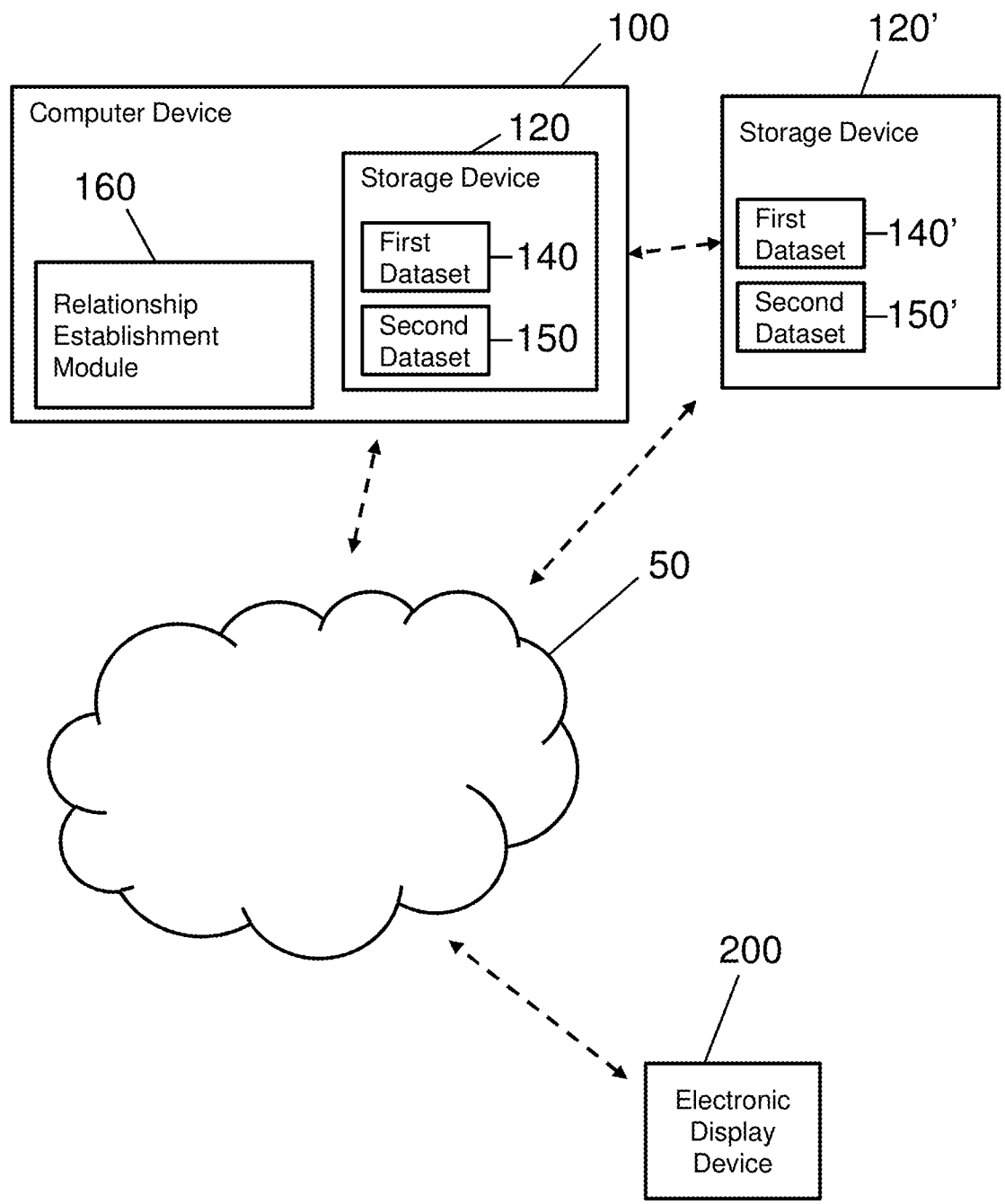
FIG. 4 shows a block diagram of an exemplary environment in accordance with aspects of the invention.

FIG. 4 shows a block diagram of an exemplary environment in accordance with aspects of the invention. In embodiments, the environment includes cloud computing environment 50 through which a computer device 100 communicates with an electronic display device 200. In embodiments, computer device 100 includes a relationship establishment module 160 that establishes relationships between certain datasets such as, for example, a first dataset 140 and a second dataset 150 if certain criteria are met. Computer device 100 may be the computer system/server 12 of FIG. 1, and relationship establishment module 160 may comprise one or more program modules 42. In embodiments, electronic display device 200 is a tablet, computer, smart phone, or any electronic device that can display a visualization of an information application. Relationship establishment module 160 accesses data in first dataset 140 and second dataset 150. In embodiments, first dataset 140 and second dataset 150 reside on a storage device 120 that is a part of computer device 100. In other embodiments, first dataset 140' and/or second dataset 150' reside on a storage device 120' that is remote from computer device 100 such as, for example, a storage device that is accessed by computer device 100 through cloud computing environment 50 or some other wireless or wired connection.

In embodiments, relationship establishment module 160 performs comparisons of metadata of attributes of datasets to determine if the datasets are related. Non-exclusive examples of attributes are product, country, brand, model, year, profit, customer satisfaction score, etc. In embodiments, an attribute is a field in a database.

As filter controls and visualizations are added to a system in accordance with embodiments of the invention, relationship establishment module 160 performs a metadata analysis on the datasets for attributes of the datasets (i.e. data used to populate the visualization). The metadata analysis gathers metadata for the attributes that are selected by the filter controls and/or apply to the requested visualizations. Non-exclusive examples of metadata used by relationship establishment module 160 are: attribute name; classification into known concepts (time, geo-spatial, country, industry code, etc.); number of distinct values; minimum value; maximum value; distribution of values; and sample values.

The metadata analysis provides metadata for datasets used by visualization and filter controls on the dashboard. Some of the following description will refer to two datasets, but it is understood that the processes also apply to the analysis of more than two datasets. In embodiments, relationship establishment module 160 uses the resultant metadata to determine what (if any) correlations there are between attributes in one dataset and attributes in the other. In embodiments, relationship establishment module 160 performs a heuristic process which scores a range of comparisons of potential attributes from different datasets (source and target attributes). Some non-exclusive examples of factors involved in the scoring are: fuzzy string matching of attribute names; data type of attributes; automatic translation between languages; comparison of the number of distinct values; a known concept being common to the attributes being compared; and the number of matches of sample values for the attributes being compared.

In embodiments, relationship establishment module 160 compares the number of distinct values of attributes of the two datasets to determine if the attributes are a match. For example, if one attribute has five distinct values and the other attribute has 1,000 distinct values, then relationship establishment module 160 will determine that the attributes are not a match due to the large difference in the number of distinct values.

Depending on the score, relationship establishment module 160 determines if a pair of source and target attributes are considered a match. In embodiments, relationship establishment module 160 uses different factors in determining if source and target attributes are a match. For example, relationship establishment module 160 uses different scoring mechanisms, weighting and thresholds. For example, in embodiments, weighting is used by the heuristic as part of deciding if two attributes from two datasets are a match. In embodiments, characteristics are weighted differently, such as, for example, data type equivalence has a higher weighting than a fuzzy name match. In embodiments, relationship establishment module 160, some other automated computer device, and/or a user manually refines the factors used over time and/or tunes the factors to specific scenarios and business areas.

In embodiments, relationship establishment module 160 matches source and target attributes on-demand, and builds a data model describing the correlation between the attributes in the source and target datasets (for example, first dataset 140 and second dataset 150). In embodiments, this information is (by choice of implementation) shown to the user on the user interface (UI), for example electronic display device 200, to show which attributes have been matched. Some embodiments also show which attributes were not able to be matched. Some embodiments allow the automatic matches generated by relationship establishment module 160 to be overruled by the user and removed from the group of matches used to develop the visualization.

Figure 5:
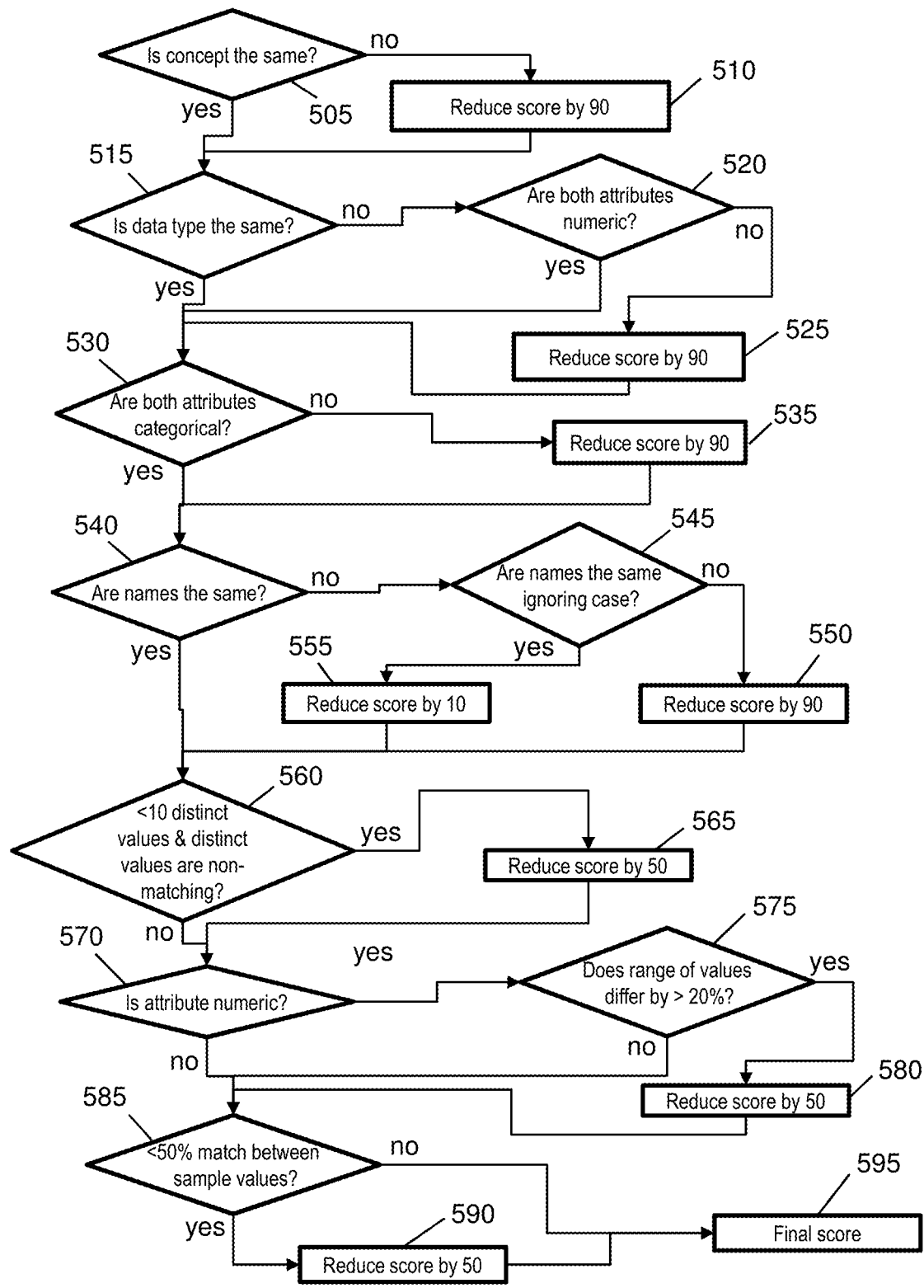
FIG. 5 shows a flowchart of an exemplary method in accordance with aspects of the invention.

FIG. 5 shows a flow chart that is an example of a heuristic approach to determining a score that is assigned to a pair of source and target attributes. As processing flows through the flow chart, relationship establishment module 160 calculates the score based on various comparisons between the source and target attributes. The comparisons shown in FIG. 5 are just examples of comparisons that are used in different embodiments. In this example, a starting score of 100 is used and the two datasets to which the source and target attributes belong (for example first dataset 140 and second dataset 150) are considered related if the resulting score is, for example, greater than 50.

At step 505 in FIG. 5, relationship establishment module 160 determines whether the concept of the source and target attributes is the same. Non-exclusive examples of concepts are: time; geo-spatial; country; and industry code. If the concept is not the same, processing continues to step 510 and the score is reduced by 90. If the concept is the same, then the score is not reduced and processing proceeds to step 515 where relationship establishment module 160 determines whether the data type of the source and target attributes is the same. Non-exclusive examples of data type are: character string; integer; and decimal.

If the data type is not the same at step 515, processing continues to step 520 where relationship establishment module 160 determines whether both attributes are numeric. If both attributes are not numeric, processing continues to step 525, where the score is reduced by 90, and then processing continues to step 530. If both attributes are numeric, processing continues directly to step 530 from step 520 and no reduction in score is realized. If the data type is the same at step 515, then processing continues directly to step 530 and no reduction in score is realized.

At step 530, relationship establishment module 160 determines whether both attributes are categorical. Non-exclusive examples of categories are: brand; and model. If both attributes are not categorical, processing continues to step 535 and the score is reduced by 90. If both attributes are categorical, then the score is not reduced and processing proceeds to step 540 where relationship establishment module 160 determines whether the names of the source and target attributes is the same.

If the names are not the same at step 540, processing continues to step 545 where relationship establishment module 160 determines whether the names are the same if the case (upper or lower) of the letters in the names is ignored. If the names are not the same if the case of the letters is ignored, processing continues to step 550 and the score is reduced by 90 and then processing continues to step 560. If the names are the same if the case of the letters is ignored, processing continues to step 555 from step 545, where the score is reduced by 10, and then processing continues to step 560. If, at step 540, relationship establishment module 160 determines that the names are the same, then processing continues directly to step 560 and no reduction in score is realized.

At step 560, relationship establishment module 160 determines whether the source and target attributes have less than ten distinct values and whether the distinct values match. If the source and target attributes have less than ten distinct values and the distinct values do not match, processing continues to step 565 and the score is reduced by 50 and then processing continues to step 570. If the source and target attributes (1) have greater than ten distinct values or (2) have less than ten distinct values and the distinct values match at step 560, then the score is not reduced and processing proceeds to step 570 where relationship establishment module 160 determines whether the attribute is numeric.

At step 570, if the attribute is numeric, processing continues to step 575 where relationship establishment module 160 determines whether the range of values differs by more than 20%. If the range of values differs by more than 20%, processing continues to step 580 where the score is reduced by 50 and then processing continues to step 585. If the range of values does not differ by more than 20%, processing continues directly to step 585 from step 575 and no reduction in score is realized. If the attribute is not numeric at step 570, then processing continues directly to step 585 and no reduction in score is realized.

At step 585, relationship establishment module 160 determines whether less than 50% of sample values of the attribute match. If less than 50% of sample values of the attribute match, processing continues to step 590 and the score is reduced by 50. If 50% or more than 50% of sample values of the attribute match at step 585, then the score is not reduced and processing proceeds to step 595 where the resulting, or final, score is established.

Relationship establishment module 160 determines that first dataset 140 and second dataset 150 are related if the resulting, or final, score is above a predetermined value (50 in this example). In embodiments, two visualizations are shown on a UI, for example electronic display device 200, with each of the visualizations showing data from a different dataset, for example first dataset 140 and second dataset 150. In other embodiments, one visualization is shown on the UI, with the visualization showing data from first dataset 140, and second dataset 150 is accessible but not shown in a visualization on the UI.

In another embodiment the system holds a first filter or visualization from an actual or virtual dataset. For example, a system holds a filter control which is not visible on a dashboard or screen. In such a filter control the system represents and selects the current date, the previous month or any other time selection. The system is then able to determine the metadata from this underlying dataset, both in the case of an actual dataset and in the case of a virtual dataset. This same metadata is then used to determine the level of correlation with attributes in a second dataset, determine the score and choose the best match. In this way, the system filters or highlights a second visualization based on the current date. Likewise, this works for any other attribute that the system knows about up-front, like, for example, the current user as a selection from a user table, or current location from a location table.

In embodiments, a determination that first dataset 140 and second dataset 150 are related results in relationship establishment module 160 using data from second dataset 150, or both datasets, in creating a visualization. If, on the other hand, relationship establishment module 160 determines that first dataset 140 and second dataset 150 are not related, then relationship establishment module 160 will not use data from second dataset 150.

Figure 6:
FIG. 6 shows a filter control list in accordance with aspects of the invention.

In embodiments, a dashboard or other style of information application is constructed of multiple widgets which include filter and/or visualization controls. A filter control is a list of values from which the user may select, such as, for example, the list of countries shown in FIG. 6. The selectable list of countries shown in FIG. 6 is just one example of a filter control in accordance with embodiments of the invention. When a filter control is placed on a dashboard, selecting a value or values through the filter control causes relationship establishment module 160 to filter any visualizations also on that dashboard. In embodiment, visualizations only show data for those values selected in the filter.

Figure 7:
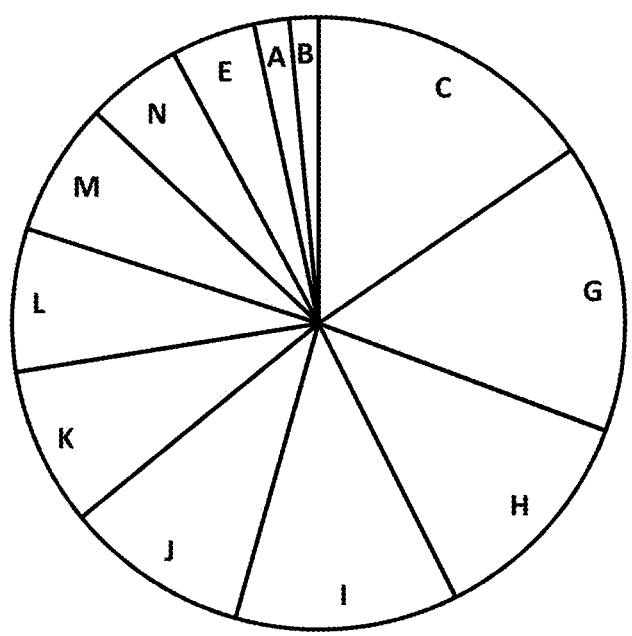
FIG. 7 shows a visualization in accordance with aspects of the invention.

In embodiments, visualization controls (such as filter controls) show aggregated values of a measure or measures broken down by zero, one, or more dimensions. For example, the pie chart in FIG. 7 shows the aggregation of sales volume broken down by brand. In this example, FIG. 7 shows sales volume for brands A-L. A dashboard becomes much more useful when it is interactive, meaning that the user can make selections in one part of the dashboard, and then other parts of the dashboard react to those selections. In some embodiments, choosing a country in the filter control of FIG. 6 causes the pie chart of FIG. 7 to be redrawn to only show values for that country.

Figure 8:
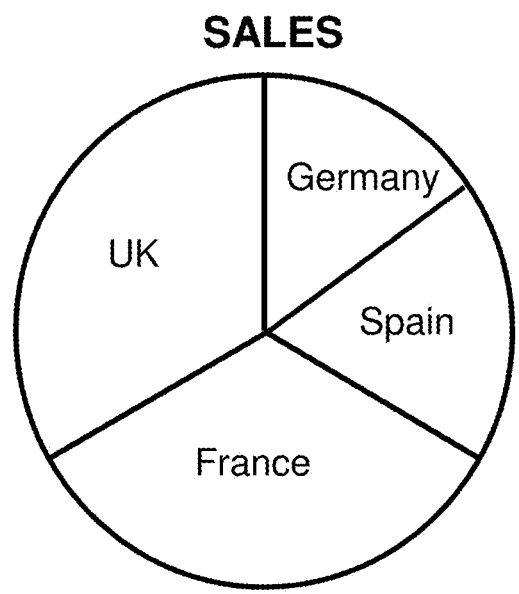
FIG. 8 shows a visualization in accordance with aspects of the invention.
Figure 9:
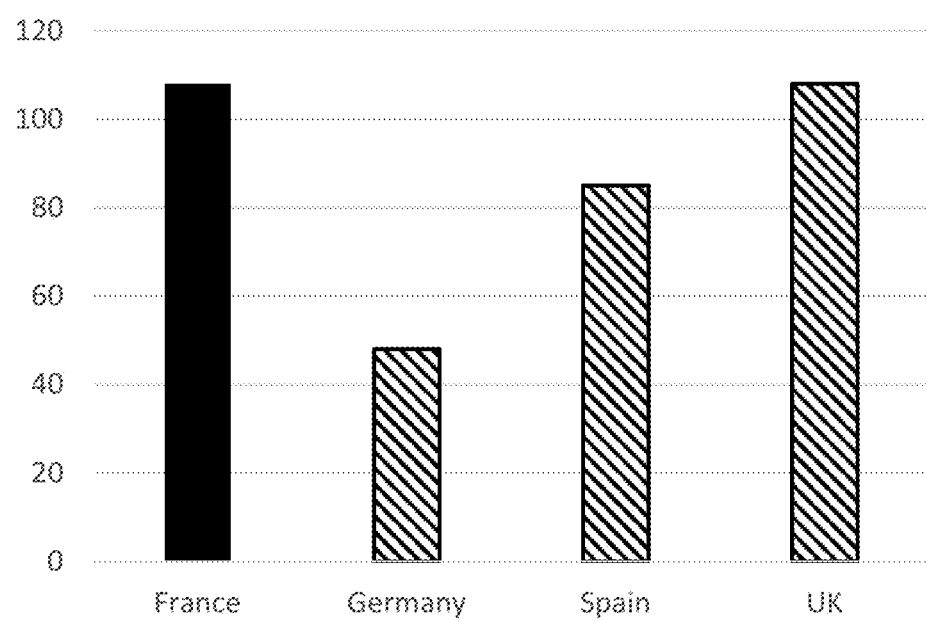
FIG. 9 shows a visualization in accordance with aspects of the invention.

In embodiments, relationship establishment module 160 controls another form of interaction which is useful in this type of application, referred to as "brushing". Brushing is when items selected in one visualization control (such as the filter control of FIG. 6) are highlighted in another. In the pie chart of FIG. 8, when a user selects the pie slice for France, occurrences of France in other visualizations (such as, for example, the visualization shown in FIG. 9) are highlighted.

Without using embodiments of the invention, when the filter controls and visualization controls source their data from different sources (for example, one is a spreadsheet and the other is a corporate database) it is not possible to achieve the interactivity described above without first building a data model establishing the correlation between attributes in one dataset with those in another. Such modeling typically requires involvement of a skilled data scientist and, as such, prevents the real time interaction afforded by embodiments of the invention. Some dashboards contain many filter controls and many visualizations with data coming from many different data sources (datasets). The data modelling needed to connect all these data sources together is often complex, time consuming, and may be too difficult for some business users in which case they would require technical help to build the dashboard.

By using information obtained from the features of embodiments of the invention descried above, a human does not need to model relationships between the different datasets. The system, for example relationship establishment module 160, infers these relationships and the interactivity of filtering and brushing happens without a data modelling step. This benefits the business user, for example, who wants a self-service business information experience such as, for example, building an interactive dashboard as simply as possible without having to go through a specialized step such as data modelling.

Embodiments of the invention are not limited to matching attributes and using a direct match of values of that attribute. In embodiments, relationship establishment module 160 intelligently matches values that are not direct matches. For example, in the case where a source filter control called Month and has values {1, 2, 3, . . . , 12}, relationship establishment module 160 analyzes the metadata to classify this as the "well-known data" "month" and relationship establishment module 160 then correctly identifies an attribute in a target visualization with name mois and values {janvier, février, mars, . . . , décembre}. Here, information about the well-known data "month" includes month names in different languages.

In some cases, the above steps of extracting metadata and deriving relationships derive incorrect relationships between datasets and/or miss valid relationships between datasets. The degree of accuracy depends on several factors such as, for example: the data itself; the sophistication of the heuristic; and the number of datasets being used on the dashboard. As a result, a user can expect that the inferred data model will not always be 100% correct.

Some embodiments of the invention allow users to manually correct the relationships that relationship establishment module 160 finds between datasets. In embodiments, users are able to add, change or remove relationships as needed and/or desired. In embodiments of the invention, relationship establishment module 160 provides a way for the user do this by providing a user interface (UI) to edit the data model. In embodiments, the UI, for example electronic display device 200, indicates which relationships are derived by the system versus those manually entered. Note that such embodiments of the invention still allow there to be no data modelling pre-requisite. The user is able to load data, create visualizations, and immediately have an interactive dashboard. In embodiments, a UI portion that allows a user to make changes to the data model is "secondary" in that it is less prominent on the UI than the portions of the UI that the user uses in the automated features of the invention described above.

Figures 10, 11:
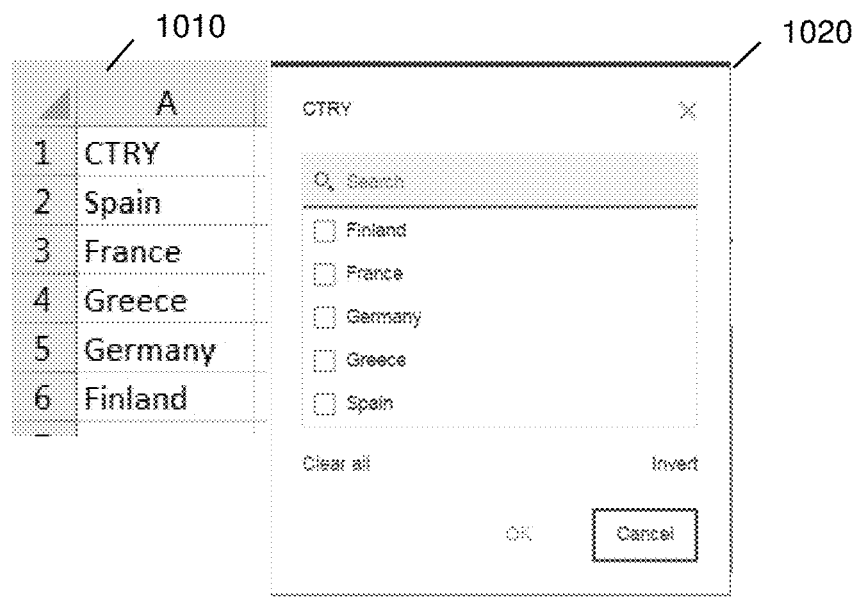
FIG. 10 shows a source spreadsheet in accordance with aspects of the invention.
FIG. 11 shows the results of an analysis of attributes in accordance with aspects of the invention.

FIGS. 10-15 are used to show an example of a method in accordance with embodiments of the invention. In this example, FIG. 10 shows a spreadsheet 1010 (source dataset such as, for example, first dataset 140) that contains countries to populate the filter control 1020 also shown in FIG. 10. Relationship establishment module 160 performs analysis on the attribute "CTRY" in the source spreadsheet to determine the information shown in FIG. 11. As shown in FIG. 11, the attribute CTRY has a data type of "string" (a character string), has 15 distinct values (including "Spain", "France", Germany", "Finland", and ten others), an attribute name of "CTRY", and sample values of "Spain", "France", Greece", Germany", and "Finland".

Figures 12, 13:
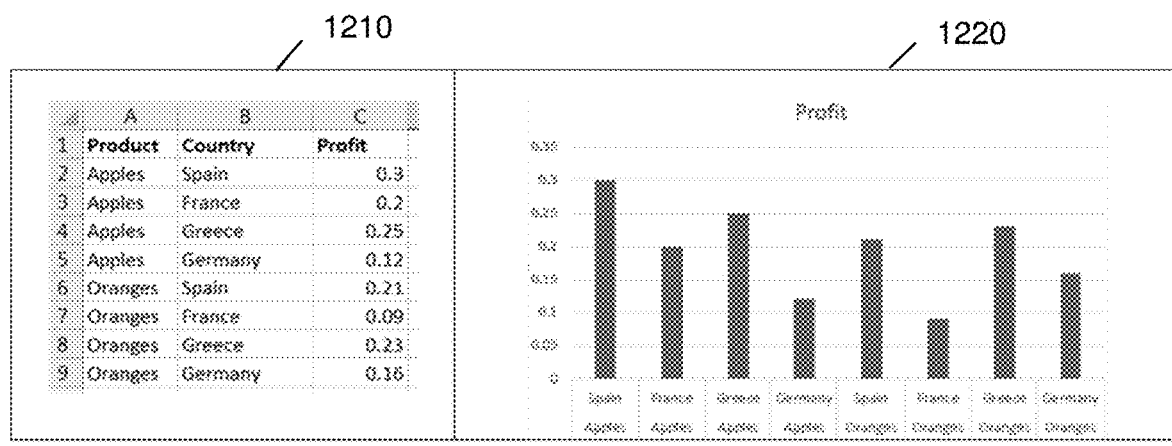
FIG. 12 shows a visualization in accordance with aspects of the invention.
FIG. 13 shows the results of an analysis of attributes in accordance with aspects of the invention.

FIG. 12 shows a database 1210 (a target dataset such as, for example, second dataset 150) that shows profit by product and country. Visualization 1220 is a bar chart showing the data in database 1210. FIG. 13 shows the results of analysis by relationship establishment module 160 for each of the attributes "Product", "Country", and "Profit" of database 1210. Attribute 1 (Product) has a data type of "string", has two distinct values (including "Apples" and "Oranges"), an attribute name of "Product", and sample values of "Apples" and "Oranges". Attribute 2 (Country) has a data type of "string", has four distinct values (including "Spain", "France", "Greece", and "Germany"), an attribute name of "Country", and sample values of "Spain", "France", "Greece", and "Germany". Attribute 3 (Profit) has a data type of "decimal", has eight distinct values (including "0.3", "0.2", "0.25", "0.12", "0.21", 0.09", "0.23", and "0.16"), an attribute name of "Profit", sample values of "0.12, . . . "; a minimum value of "0.12", a maximum value of "0.25", and a standard deviation of "0.069076".

Figure 14:
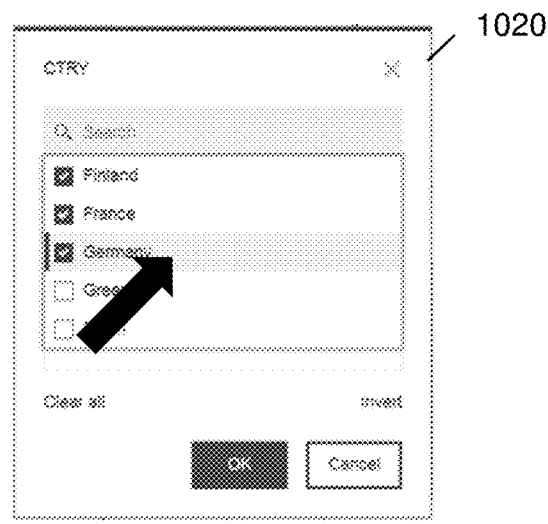
FIG. 14 shows a filter control list in accordance with aspects of the invention.
Figure 15:
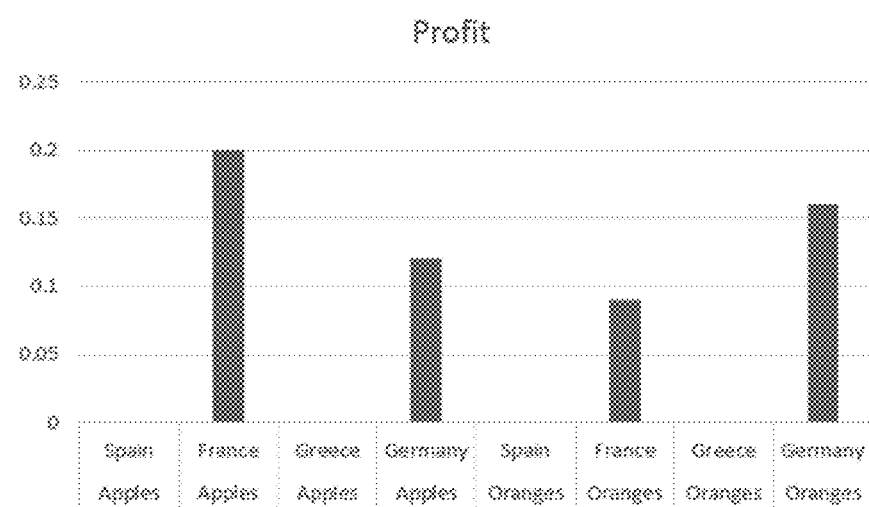
FIG. 15 shows a visualization in accordance with aspects of the invention.

Relationship establishment module 160 uses the analysis shown in FIGS. 11 and 13 to determine if the target dataset (database 1210) and the source dataset (spreadsheet 1010) are related (by, for example, the method shown in FIG. 5). In this example, the heuristic used by relationship establishment module 160 checks for the same data type, performs fuzzy string matching on attribute names, and also looks at commonality of sample values to determine that "CTRY" in filter control 1020 (and thus spreadsheet 1010) matches "Country" in bar chart 1220 (and thus database 1210). Selecting a value in the filter control 1020 will then automatically filter the data shown on bar char 1220 as shown in FIGS. 14 and 15. In FIG. 14 a user selects the countries "Finland", "France", and "Germany". As a result, bar chart 1220 from FIG. 12 (that corresponds to database 1210 (second dataset 150)) is redrawn as shown in FIG. 15 showing only data that corresponds to the countries selected in FIG. 14 (which is filter control 1020 that corresponds to spreadsheet 1010 (first dataset 140)). Even though "Finland" was selected in FIG. 14, the bar chart in FIG. 15 does not show any results corresponding to "Finland" because no data for "Finland" exists in database 1210 (and, thus, bar chart 1220). Relationship establishment module 160, in the procedure shown in FIGS. 10-15 and described above, allowed the user to display in a visualization data from one dataset (database 1210) by selecting options in a second dataset (spreadsheet 1010 through filter control 1020) without any modeling being required.

Figure 16:
FIG. 16 shows a visualization in accordance with aspects of the invention.
Figure 17:
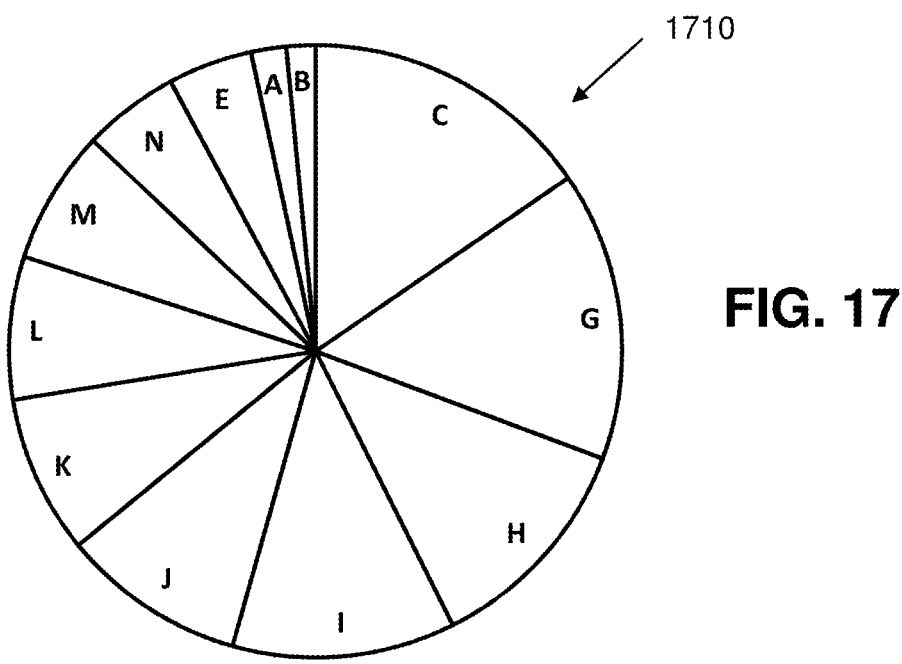
FIG. 17 shows a visualization in accordance with aspects of the invention.

FIGS. 16-22 are used to show another example of a method in accordance with embodiments of the invention. In this example, FIG. 16 shows a bar chart 1610 that shows a customer satisfaction score of several models of automobiles. FIG. 17 shows a pie chart 1710 that shows the sales volume of automobile brands, including the brands that produce the models shown in FIG. 16. The following will show how relationship establishment module 160 determines that the independent datasets, from which bar chart 1610 and pie chart 1710 are derived, are related to each other.

Bar chart 1610 is a visualization of the data in database 1810 shown in FIG. 18. Relationship establishment module 160 performs analysis on the attributes "Brand", "Model", and "CS Score" of database 1810, the results of which are shown in FIG. 19. FIG. 19 shows the data type, number of distinct values, attribute name, and sample values of each of the attributes in database 1810. Because "CS Score" has a data type of decimal, the minimum, maximum, and standard deviation of "CS Score" are also calculated.

Pie chart 1710 is a visualization of the data in database 2010 shown in FIG. 20. Relationship establishment module 160 performs analysis on the attributes "Type" and "Volume" of database 1210, the results of which are shown in FIG. 21. FIG. 21 shows the data type, number of distinct values, attribute name, and sample values of each of the attributes in database 2010. Because "Volume" has a data type of integer, the minimum, maximum, and standard deviation of "Volume" are also calculated.

Figure 22:
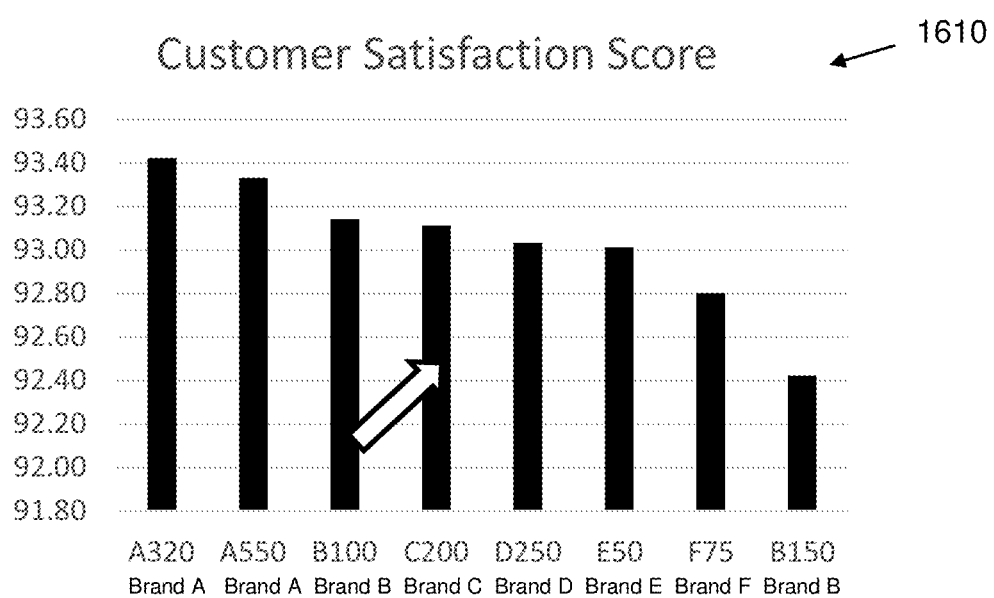
FIG. 22 shows the selection of a bar of a bar chart in accordance with aspects of the invention.

A user selects a bar in the first visualization (bar chart 1610) and wants to view the second visualization (pie chart 1710) in context of that selection. The heuristic then looks for matches for categories that have been selected. In this Example, a user that wants to see more information regarding a particular bar in bar chart 1610 selects that bar by clicking on it or some other selection method. For example, a user that wants more information regarding the model "C200", selects the corresponding bar in bar chart 1610, as shown in FIG. 22. The selection relates to Brand and Model. There is no attribute name match for Brand in database 2010, but the data type ("string") and a high percentage of sample values match (1) attribute Type in the second visualization (pie chart 1710) showing sales volume to (2) attribute Brand in the first visualization (bar chart 1610). In this manner, embodiments of the invention (by relationship establishment module 160) provide a drill through to the second visualization where data related to C200 (in this case the sales volume of Brand C) is shown. In some embodiments, the related data is shown filtered or highlighted.

Figure 23:
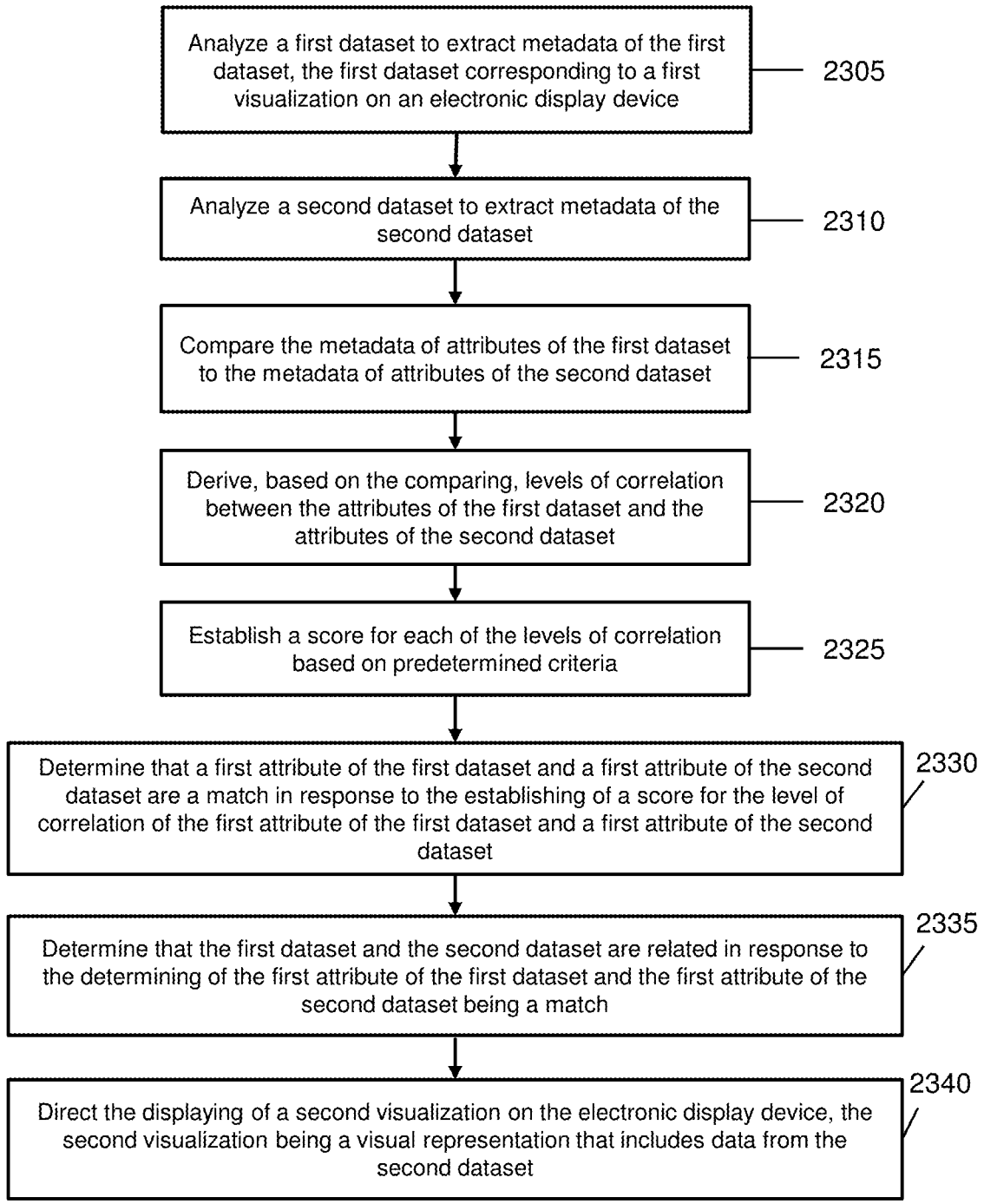
FIG. 23 shows a flowchart of an exemplary method in accordance with aspects of the invention.

FIG. 23 shows a flowchart of an exemplary method in accordance with aspects of the present invention. Steps of the method may be carried out in the environment of FIG. 4 and are described with reference to elements depicted in FIG. 4.

At step 2305, relationship establishment module 160 analyzes first dataset 140 to extract metadata of first dataset 140, first dataset 140 corresponding to a first visualization. At step 2310, relationship establishment module 160 analyzes second dataset 150 to extract metadata of second dataset 150. At step 2315, relationship establishment module 160 compares the metadata of attributes of first dataset 140 to the metadata of attributes of second dataset 150. At step 2320, relationship establishment module 160 derives, based on the comparing, correlations between the attributes of first dataset 140 and the attributes of second dataset 150. At step 2325, relationship establishment module 160 establishes a score for each of the correlations. At step 2330, relationship establishment module 160 determines that a first attribute of first dataset 140 and a first attribute of second dataset 150 are a match in response to the establishing of a score for a correlation of the first attribute of first dataset 140 and a first attribute of second dataset 150. At step 2335, relationship establishment module 160 determines that first dataset 140 and second dataset 150 are related in response to the determining that the first attribute of first dataset 140 and the first attribute of second dataset 150 are a match. At step 2340, relationship establishment module 160 directs the displaying of a second visualization, the second visualization being a visual representation that includes data from second dataset 150. In embodiments, the term "second visualization" refers to a new version of a visualization that currently exists on the UI. In embodiments, the term "second visualization" refers to an additional visualization to those already shown on the UI.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

analyzing, by a computer device, a first dataset to extract metadata of the first dataset, the first dataset corresponding to a first visualization presented to a user on an electronic display device, wherein the metadata of the first dataset includes a range of characteristics for attributes of the first dataset;

analyzing, by the computer device, a second dataset to extract metadata of the second dataset, wherein the metadata of the second dataset includes a range of characteristics for attributes of the second dataset, wherein the computer device is configured to access the first and second dataset from both a same storage location and a different storage location, and wherein the computer device is configured to access the first and second dataset both with a same format and a different format;

comparing, using a heuristic method, by the computer device, the metadata of the first dataset to the metadata of the second dataset;

deriving, by the computer device, and based on the comparing, a level of correlation between attributes of the first dataset and attributes of the second dataset;

establishing, by the computer device, a score for each of the levels of correlation;

determining, by the computer device, that a first attribute of the first dataset and a first attribute of the second dataset are a match in response to the establishing of a score for the level of correlation of the first attribute of the first dataset and a first attribute of the second dataset;

determining, by the computer device, that the first dataset and the second dataset are related in response to the determining that the first attribute of the first dataset and the first attribute of the second dataset are a match; and providing to the user, by the computer device, a second visualization on the electronic display device, the second visualization being a visual representation that includes data from the second dataset, responsive to the determining that the first dataset and the second dataset are related.

2. The computer-implemented method of claim 1, further comprising receiving, by the computer device, a selection by a user of the first attribute from the first visualization, the first visualization being a visual representation of data from the first dataset.

3. The computer-implemented method of claim 2, wherein the providing comprises directing, by the computer device, the displaying of the second visualization on the electronic display device on which the first visualization was displayed, wherein both the first visualization and second visualization are concurrently displayed on the electronic display within an interactive user interface.

4. The computer-implemented method of claim 1, wherein the score of a first one of the levels of correlation is based on first criteria, the score of a second one of the levels of correlation is based on second criteria, and the first criteria and the second criteria are different.

5. The computer-implemented method of claim 1, wherein the establishing of the scores is based on predetermined criteria.

6. The computer-implemented method of claim 1, wherein the determining that the first attribute of the first dataset and the first attribute of the second dataset are a match is based on the score of the level of correlation of the first attribute of the first dataset and the first attribute of the second dataset being greater than a threshold score.

7. The computer-implemented method of claim 1, wherein the heuristic method comprises fuzzy string matching of a name of the first attribute of the first dataset and a name of the first attribute of the second dataset.

8. The computer-implemented method of claim 1, wherein the comparing comprises comparing a number of distinct values of the first attribute of the first dataset and a number of distinct values of the first attribute of the second dataset.

9. The computer-implemented method of claim 1, further comprising analyzing, by the computer device, a third dataset to extract metadata of the third dataset wherein the metadata of the third dataset includes a range of characteristics for attributes of the third dataset, wherein the computer device is configured to access the first, second and third dataset from a combination of a same storage location and a different storage location, and wherein the computer device is configured to access the first, second and third dataset with any combination of a same format and a different format;

comparing using a heuristic method, by the computer device, the metadata of the second dataset to the metadata of the third dataset;

deriving, by the computer device, and based on the comparing of the metadata of the second dataset to the metadata of the third dataset, a level of correlation between the attributes of the second dataset and attributes of the third dataset;

establishing, by the computer device, a score for each of the levels of correlation between the attributes of the second dataset and the attributes of the third dataset;

determining, by the computer device, that a second attribute of the second dataset and a first attribute of the third dataset are a match in response to the establishing of a score for a level of correlation of the second attribute of the second dataset and a first attribute of the second dataset; and determining, by the computer device, that the second dataset and the third dataset are related in response to the determining that the second attribute of the second dataset and the first attribute of the third dataset are a match.

10. The computer-implemented method of claim 9, further comprising providing to the user, by the computer device, a third visualization on the electronic display device, the third visualization being a visual representation including data from the third dataset, responsive to the determining that the second dataset and the third dataset are related.

11. The computer-implemented method of claim 1, wherein the computer device includes software provided as a service in a cloud computing environment.

12. A computer program product, the computer program product comprising a computer readable storage medium having program instructions embodied therewith, the program instructions executable by a computing device to cause the computing device to:

analyze a first dataset to extract metadata of the first dataset, the first dataset corresponding to a first visualization presented to a user on an electronic display device;

analyze a second dataset to extract metadata of the second dataset, wherein the program instructions are configured to access the first and second dataset from both a same storage location and a different storage location, and wherein the program instructions are configured to access the first and second dataset both with a same format and a different format;

compare, using a heuristic method, the metadata of the first dataset to the metadata of the second dataset, wherein the comparing includes performing fuzzy string matching of a name of the first attribute of the first dataset and a name of the first attribute of the second dataset;

derive, based on the comparing, a level of correlation between attributes of the first dataset and attributes of the second dataset;

establish a score for each of the levels of correlation;

determine that a first attribute of the first dataset and a first attribute of the second dataset are a match in response to the establishing of a score for the level of correlation of the first attribute of the first dataset and a first attribute of the second dataset;

determine that the first dataset and the second dataset are related in response to the determining that the first attribute of the first dataset and the first attribute of the second dataset are a match; and provide to the user a second visualization on the electronic display device, the second visualization being a visual representation that includes data from the second dataset, responsive to the determining that the first dataset and the second dataset are related.

13. The computer program product of claim 12, further comprising program instructions executable by the computing device to cause the computing device to:

analyze a third dataset to extract metadata of the third dataset, wherein the program instructions are configured to access the first, second and third datasets from a combination of a same storage location and a different storage location, and wherein the program instructions are configured to access the first, second and third datasets with any combination of a same format and a different format;

compare, using a heuristic method, the metadata of the second dataset to the metadata of the third dataset;

derive, based on the comparing of the metadata of the second dataset to the metadata of the third dataset, a level of correlation between the attributes of the second dataset and attributes of the third dataset;

establish a score for each of the levels of correlation between the attributes of the second dataset and the attributes of the third dataset;

determine that a second attribute of the second dataset and a first attribute of the third dataset are a match in response to the establishing of a score for the level of correlation of the second attribute of the second dataset and a first attribute of the second dataset;

determine that the second dataset and the third dataset are related in response to the determining that the second attribute of the second dataset and the first attribute of the third dataset are a match; and provide to the user a third visualization on the electronic display device, the third visualization being a visual representation that includes data from the third dataset, responsive to the determining that the second dataset and the third dataset are related.

14. The computer program product of claim 13, further comprising program instructions executable by the computing device to cause the computing device to:

determine that the first dataset and the third dataset are related in response to the determining that the second attribute of the second dataset and the first attribute of the third dataset are a match.

15. The computer program product of claim 14, wherein the first attribute of the second dataset and the second attribute of the second dataset are different.

16. A system comprising:

a processor, a computer readable memory, and a computer readable storage medium;

program instructions to analyze a first dataset to extract metadata of the first dataset presented to a user as a first visualization on an electronic display device;

program instructions to analyze a second dataset to extract metadata of the second dataset, wherein the program instructions are configured to access the first and second dataset from both a same storage location and a different storage location, and wherein the program instructions are configured to access the first and second dataset both with a same format and a different format;

program instructions to compare, using a heuristic method, the metadata of the first dataset to the metadata of the second dataset;

program instructions to derive, based on the comparing, a level of correlation between attributes of the first dataset and attributes of the second dataset;

program instructions to establish a score for each of the levels of correlation;

program instructions to determine that a first attribute of the first dataset and a first attribute of the second dataset are a match in response to the establishing of a score for the level of correlation of the first attribute of the first dataset and a first attribute of the second dataset;

program instructions to determine that the first dataset and the second dataset are related in response to the determining that the first attribute of the first dataset and the first attribute of the second dataset are a match; and program instructions to provide to the user a second visualization on the electronic display device, the second visualization being a visual representation that includes data from the second dataset, responsive to the determining that the first dataset and the second dataset are related, wherein the program instructions are stored on the computer readable storage medium for execution by the processor via the computer readable memory.

17. The system of claim 16, wherein the first dataset corresponds to the first and second visualization displayed on the electronic display device within an interactive user interface.

18. The system of claim 16, further comprising program instructions that allow the user to manually override the determination that the first dataset and the second dataset are related.

19. The computer program product of claim 12, wherein both the first visualization and second visualization are concurrently displayed on the electronic display within an interactive user interface.

20. The system of claim 16, wherein the heuristic method includes program instructions to perform fuzzy string matching of a name of the first attribute of the first dataset and a name of the first attribute of the second dataset.

* * * * *